United States Patent [19]
Fukumoto et al.

[11] Patent Number: 5,764,606
[45] Date of Patent: Jun. 9, 1998

[54] TRACKING CONTROL APPARATUS FOR A MULTI-LAYER OPTICAL DISC AND METHOD THEREFOR

[75] Inventors: Atsushi Fukumoto; Motoi Kimura, both of Kanagawa; Yoshiaki Kato, Tokyo, all of Japan

[73] Assignee: Sony Corporation, Japan

[21] Appl. No.: 762,448

[22] Filed: Dec. 9, 1996

[30] Foreign Application Priority Data

Dec. 12, 1995 [JP] Japan .................. 7-322867

[51] Int. Cl.$^6$ .................................. G11B 7/095
[52] U.S. Cl. .................... 369/44.41; 369/44.37; 369/94
[58] Field of Search ................ 369/44.37, 44.38, 369/44.41, 44.42, 44.34, 44.26, 94, 124, 44.35, 44.36

[56] References Cited

U.S. PATENT DOCUMENTS

| | | | |
|---|---|---|---|
| 4,712,206 | 12/1987 | Kanda | 369/44.37 |
| 4,750,162 | 6/1988 | Tajima | 369/44.37 |
| 5,202,875 | 4/1993 | Rosen et al. | 369/94 |
| 5,408,452 | 4/1995 | Sakemoto et al. | 369/44.41 |

*Primary Examiner*—Thang V. Tran
*Attorney, Agent, or Firm*—Ronald P. Kananen

[57] ABSTRACT

In a three-spot tracking control system for a multi-layer optical disc, stray light of the signal-reproducing main beam from a layer other than the layer being reproduced leaks into first and second photodetectors receiving the reflected beam of two auxiliary tracking controlling beams to render the tracking operation unstable. In order to overcome this drawback, a first photodetector detects one auxiliary reflected beam from one or the other of the information signal layers of a double-layer optical disc. The second photodetector detects the other reflected auxiliary beam from the information signal layer. A first upper envelope detector detects the upper envelope signal of the reflected auxiliary beam. A second upper envelope detector detects the upper envelope signal of the detection signal of the other reflected auxiliary beam. A first subtractor subtracts the detected output by the first upper envelope detector 6 from the detection signal of the first photodetector. A second subtractor subtracts the detected output by the second upper envelope detector from the detection signal of the second photodetector. A third subtractor performs subtraction between outputs of the first subtractor and the second subtractor.

8 Claims, 7 Drawing Sheets

TRACK T

LIGHT SPOT G+

LIGHT SPOT G0

LIGHT SPOT G-

TRACKING CONTROL APPARATUS FOR A MULTI-LAYER OPTICAL DISC AND METHOD THEREFOR

BACKGROUND OF THE INVENTION

1. Field of the Invention

This invention relates to a tracking control apparatus for a multi-layer optical disc for controlling tracking of the multi-layer optical disc made up of plural information signal layers. More particularly, this invention relates to a tracking control apparatus for a multi-layer optical disc for controlling tracking of a main light beam according to a difference of the reflection of two auxiliary beams.

2. Description of Related Art

In conventional optical disc reproduction, a three-spot tracking system has been known in which a signal reproducing main beam and two auxiliary tracking-controlling beams, radiated on the disc with an radial offset of about one-half track with respect to the main beam, are used for controlling the tracking of the signal-reproducing main beam. The reflected beams of the two tracking-controlling auxiliary beams from the optical disc are detected by first and second photodetectors. Low-frequency components of the difference between signals obtained by the first and second photodetectors are used as a tracking error signal.

Figure 1:
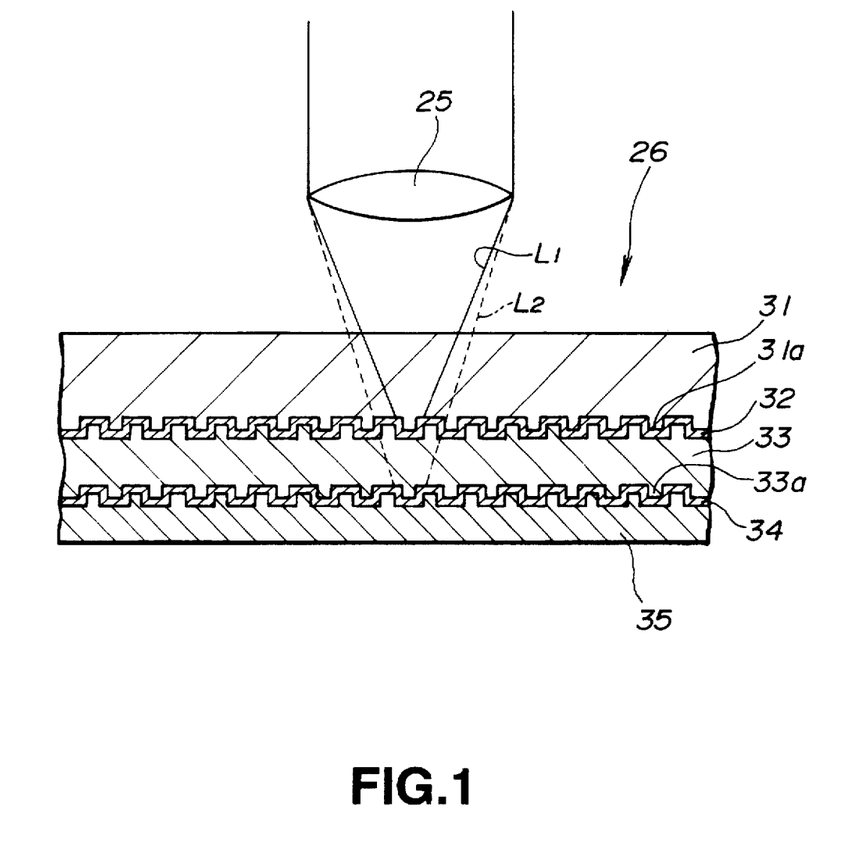
FIG. 1 is a cross-sectional view of a double-layer optical disc.

In optical discs as storage means for computers or package media for music or video information, a recent tendency is toward high recording density. As one of the methods for achieving high recording density, a multi-layer optical disc, comprised of plural information signal layers as signal recording area, has been proposed. An example of such multi-layer optical disc is a double-layer optical disc comprised of two information signal recording layers as an information signal recording area. Referring to FIG. 1, a double-layer optical disc 26 includes a disc substrate 31 of a transparent synthetic resin material, such as polycarbonate, on one surface of which a first information signal layer 31a has been formed by a row of pits. A semi-transparent reflective film 32 of a thin dielectric film of, for example, silicon nitride $SiN_2$, is formed on the first information signal layer 31a. The double-layer optical disc 26 also includes an intermediate layer 33 made of a transparent resin material, which is 40 µm in thickness. A second information signal layer 33a is formed on the surface of the intermediate layer 32 opposite to its surface in contact with the semi-transparent reflective layer 32 by a row of pits. The double-layer optical disc 26 further includes a reflective layer 34 of, for example, aluminum Al, formed on the second information signal layer 33a, and a protective or covered layer 35 deposited on the reflective film 34. The covered layer 35 may be a substrate as in a video disc, or a layer bonded to the substrate.

For reading information signals from the double-layer optical disc 26, the focal position of the laser light radiated from an objective lens 25 of an optical pickup unit shown in FIG. 1 is varied in two stages. That is, for reading out information signals on the first information signal layer 31a, it suffices if a spot of a focal point by a laser light beam $L_1$ is set on the row of pits recorded on the first information signal layer 31a. On the other hand, for reading out information signals on the second information signal layer 33a, it is sufficient if the spot of a focal point formed by the laser light $L_2$ shown by a broken line in FIG. 1 is set on the row of pits recorded on the second information signal layer 33a.

The optical disc may also comprise a first substrate bonded by a resin layer to a second substrate, wherein recorded surfaces may be provided on either opposed surface of each of the first and second substrates. Reproduction may then occur from each recording layer.

The tracking control system employing the "so-called" three-beam method may also be used in reproducing the information signals from such double-layered optical disc 26.

However, with the method employing a three-spot tracking control as described above, the light reflected from the layer other than the layer being reproduced, that is, the stray light, leaks into first and second photodetectors receiving the reflected light beams of the two tracking-controlling auxiliary beams. The result is that correct tracking error signals occasionally cannot be produced thus leading to an unstable tracking operation.

For example, if stray light incident on the first photodetector is equal to that incident on the second photodetector, correct tracking error signals can be produced, thus assuring a stable tracking operation. However, if the amount of stray light leaking into one of the first and second photodetectors differs from that leaking into the other photodetector due to, for example, movement of stray light spots on first and second photodetector surfaces caused by transverse movements of the objective lens during tracking or due to mechanical position deviation of the photodetectors, an offset is produced in the tracking error signals, thus disabling correct tracking.

SUMMARY OF THE INVENTION

It is therefore an object of the present invention to provide a tracking control apparatus for a multi-layer optical disc whereby the offset in the tracking error signals produced due to, for example, movement of stray light spots on first and second photodetector surfaces, caused by transverse movements of the objective lens during tracking or due to mechanical position deviation of the photodetectors, may be eliminated for enabling stable tracking.

With the tracking control apparatus for a multi-layer optical disc according to the present invention, the above problem produced in tracking control of a multi-layer optical disc using the three-spot method may be solved by: subtracting the upper envelope signal of one of the reflected auxiliary beams detected by a first envelope detection means from a detection signal of one of the reflected auxiliary beams from the track of one of the information signal layers detected by the first photodetector means; subtracting the upper envelope signal of the other reflected auxiliary beam detected by a second upper envelope detection means from a detection signal of the other auxiliary reflected beam from the track of the one information signal layer detected by a second photodetector means by a second subtraction means; and by subtracting outputs of the first and second subtraction means by a third subtraction means. The result is that, in reproducing signals from a multi-layered optical disc, it becomes possible to eliminate offset in the tracking error signal produced by movement of the stray light spot on the photodetector surface caused by transverse movement of the objective lens during tracking or mechanical deviations of the photodetector positions.

DESCRIPTION OF THE PREFERRED EMBODIMENTS

Referring to the drawings, a preferred embodiment of a tracking control apparatus for a multi-layer optical disc according to the present invention will be explained in detail. Although the invention is discussed in connection with a double-layer optical disc, it is equally applicable to pairs of recording layers respectively formed on each recording layer of each substrate of the optical disc.

The present embodiment is directed to a tracking control apparatus for a double-layer optical disc comprised of first and second information signal layers layered together, as shown schematically in FIG. 1, as previously discussed. With the described tracking controlling apparatus, a signal-reproducing main beam and two tracking-controlling auxiliary beams are radiated on a track of an information signal layer of the double-layered optical disc. The tracking of a track on one of the information signal layers of the double-layered optical disc by the main beam is controlled responsive to the difference of the reflected light beams of the two auxiliary light beams from the information signal layer. With the present tracking control apparatus, a track of the other information signal recording layer of the double-layer optical disc is irradiated with the signal-reproducing main beam and two tracking controlling auxiliary beams for controlling the tracking by the main beam of a track of the other information signal layer of the double-layer optical disc responsive to the difference in the reflected auxiliary light beams from the information signal layer.

Figure 2:
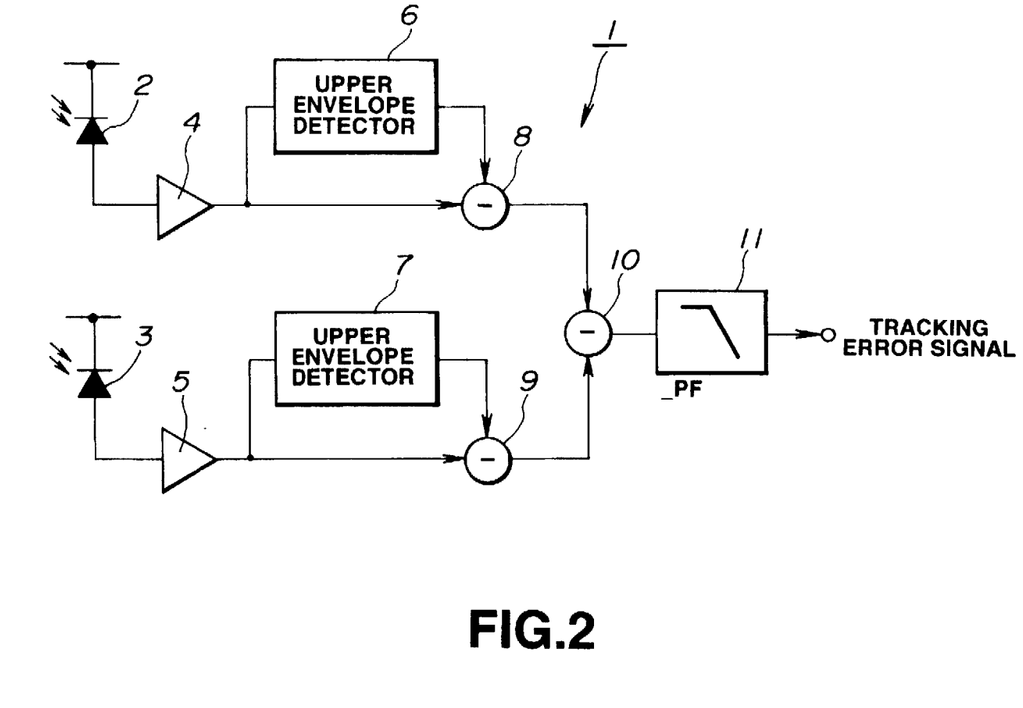
FIG. 2 is a block diagram of a tracking control apparatus for a double-layer optical disc embodying a tracking control apparatus for a multi-layered optical disc according to the present invention.

Specifically, as shown in FIG. 2, the tracking controlling apparatus 1 for the double-layer optical disc 26 includes a first photodetector 2 for detecting one of two auxiliary light beams reflected from the information signal layer, and a second photodetector 3 for detecting the other reflected auxiliary light beam. The tracking controlling apparatus 1 also includes a first upper envelope detector 6 for detecting an upper envelope signal of the detection signals of the reflected auxiliary beam detected by the first photodetector 2 and a second upper envelope detector 7 for detecting an upper envelope signal of the detection signals of the other reflected auxiliary beam detected by the second photodetector 3. The tracking controlling apparatus also includes a first subtractor 8 for subtracting a detection output of the first upper envelope detector 6 from the detection signal of the first photodetector 2, a second subtractor 9 for subtracting a detection output of the second upper envelope detector 7 from the detection signal of the second photodetector 3, and a third subtractor 10 for performing subtraction between an output of the first subtractor 8 and an output of the second subtractor 9.

The detection signal of the reflected auxiliary beam detected by the first photodetector 2 is converted by a current-to-voltage converting amplifier 4 into a voltage signal which is amplified and then supplied to the first upper envelope detector 6 and to the first subtractor 8. The detection signal of the other reflected auxiliary beam, as detected by the second photodetector 3, is converted by a current-to-voltage converting amplifier 5 into voltage signals which are then amplified and routed to the second upper envelope detector 7 and to the second subtractor 9.

A subtraction output of the third subtractor 10 is bandwidth-limited by a low-pass filter (LPF) 11 before being outputted as a tracking error signal.

Figure 3:
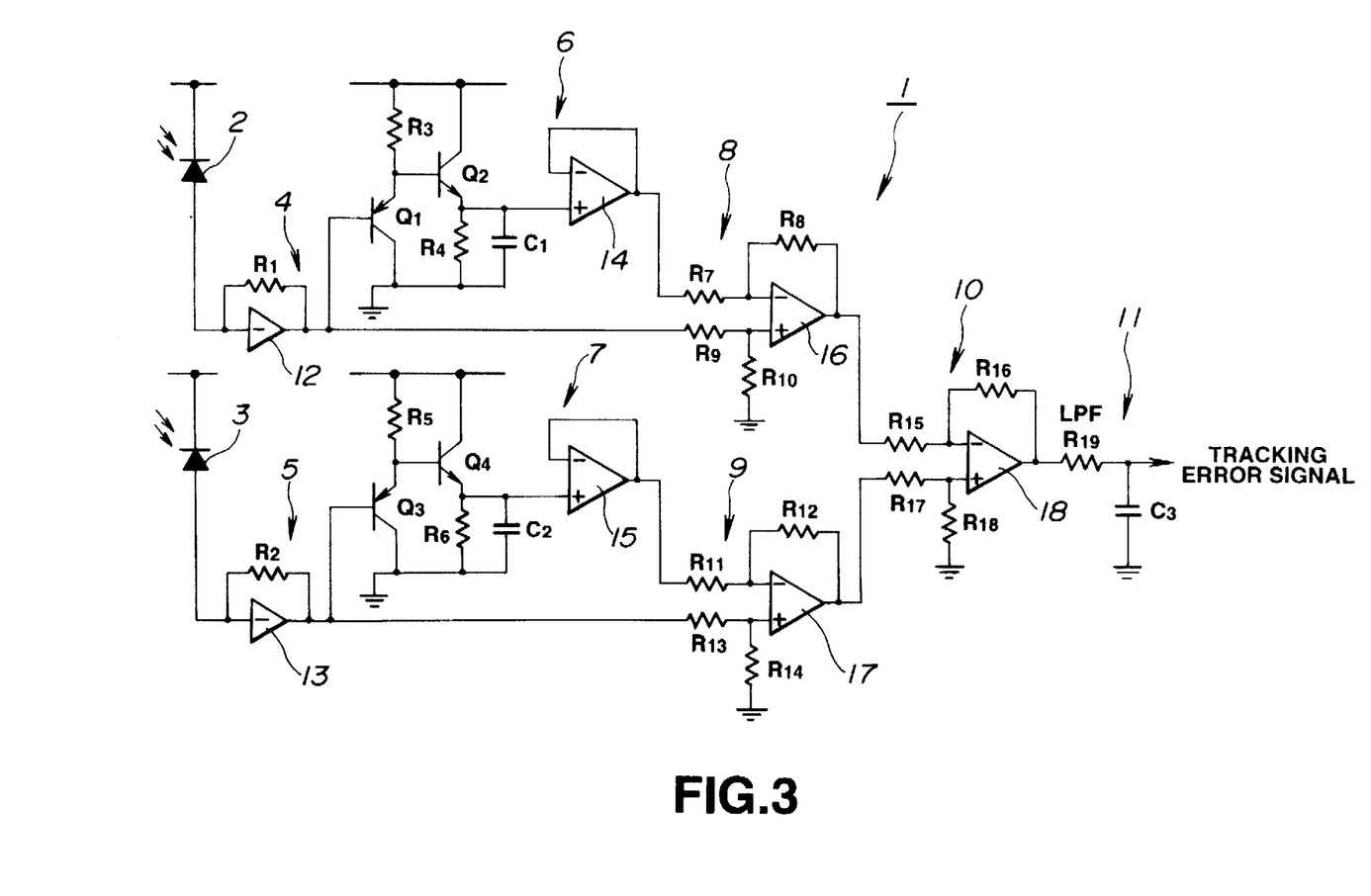
FIG. 3 is an illustrative circuit diagram showing various portions of a tracking control apparatus for the double-layer optical disc.

The above-described various components of the tracking control apparatus for the double-layer optical disc are arranged in a circuit configuration shown in FIG. 3. That is, the current-to-voltage converting amplifier 4 is made up of a resistor $R_1$ and an amplifier 12, while the current-to-voltage converting amplifier 5 is made up of a resistor $R_2$ and an amplifier 13. The first upper envelope detector 6 is made up of transistors $Q_1$ and $Q_2$ and a differential amplifier 14. The transistor $Q_1$ has its collector grounded, its emitter connected to a resistor $R_3$, and its base provided with an output signal of the current-to-voltage converting amplifier 4. The transistor $Q_2$ has its base connected to an emitter of the transistor $Q_1$, and its emitter connected to a parallel connection of a resistor $R_4$ and a capacitor $C_1$. The differential amplifier 14 has its positive input terminal connected to an emitter of the transistor $Q_1$ and has its output fed back to its negative input terminal. The second upper envelope detector 7 is made up of a transistor $Q_3$, a transistor $Q_4$ and a differential amplifier 15. The transistor $Q_3$ has its collector grounded, its emitter connected to a resistor $R_5$, and its base provided with an output signal of the current-to-voltage converting amplifier 5. The transistor $Q_4$ has its base connected to an emitter of the transistor $Q_3$ and its emitter connected to a parallel connection of a resistor $R_6$ and a capacitor $C_2$. The differential amplifier 15 has its positive input terminal connected to an emitter of the transistor $Q_4$ and has its output fed back to its negative input terminal.

The first subtractor 8 is comprised of a differential amplifier 16 having its positive input terminal connected via a resistor $R_9$ to an output terminal of the current-to-voltage converting amplifier 4 and grounded via a resistor $R_{10}$. The differential amplifier 16 has its negative input terminal connected via a resistor $R_7$ to an output terminal of the first upper envelope detector 6 and has its output fed back via a resistor $R_8$ to its negative input terminal. The second subtractor 9 is comprised of a differential amplifier 16 having its positive input terminal connected via a resistor $R_{13}$ to an output terminal of the current-to-voltage converting amplifier 5 and grounded via a resistor $R_{14}$. The differential amplifier has its negative input terminal connected via a resistor $R_{11}$ to an output terminal of the first upper envelope detector 6 and has its output fed back via a resistor $R_{12}$ to its negative input terminal. The third subtractor 10 is comprised of a differential amplifier 18 having its positive input terminal connected via a resistor $R_{17}$ to an output terminal of a second subtractor 9 and grounded via a resistor $R_{18}$. The differential amplifier has its negative input terminal connected via a resistor $R_{15}$ to an output terminal of the first subtractor 9 and has its output fed back via a resistor $R_{16}$ to its negative input terminal. The LPF 11 is comprised of a resistor $R_{19}$ and a capacitor $C_3$.

Figure 4:
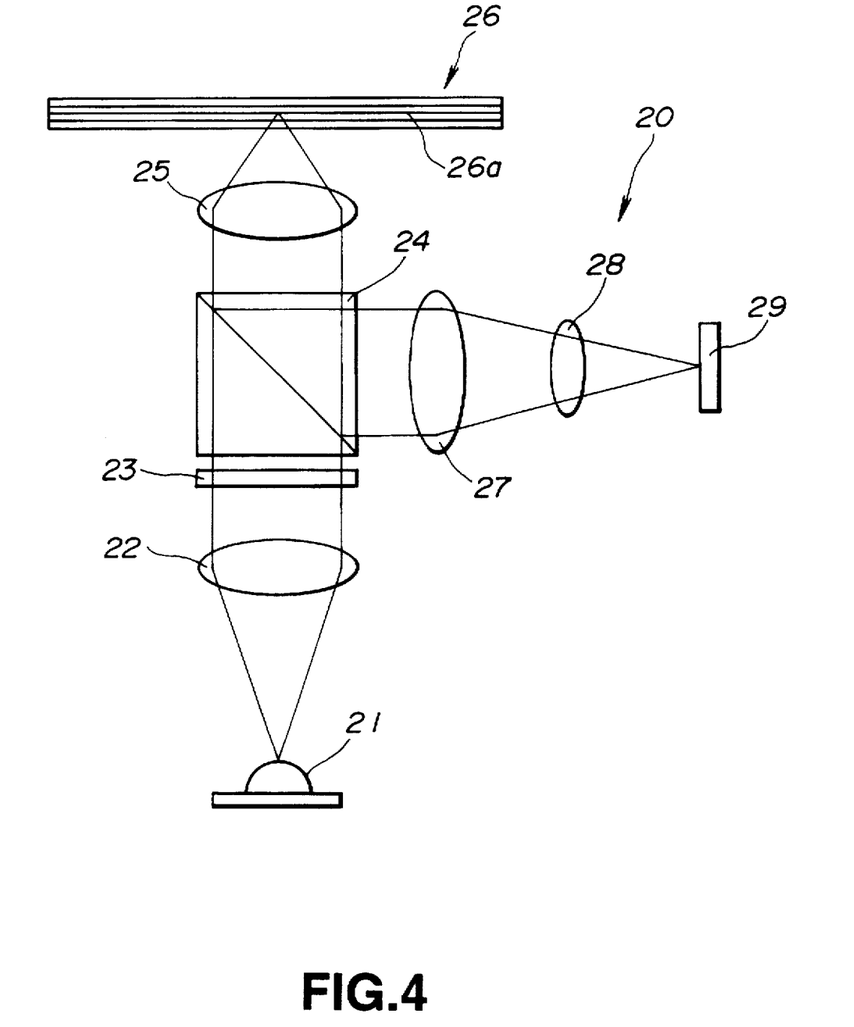
FIG. 4 is a schematic view of an optical pickup device for a double-layer optical disc supplying a detection signal to a tracking control apparatus for the double-layer optical disc.

The tracking control apparatus 1 for the double-layer optical disc 26 is connected to an optical pickup unit 20 for the double-layer optical disc as shown in FIG. 4 for performing tracking control of the double-layer optical disc. Before providing an explanation of the operation of the tracking control apparatus for the double-layer optical disc 26, the optical pickup unit 20 for the double-layer optical disc 26 is first explained.

Figure 5:
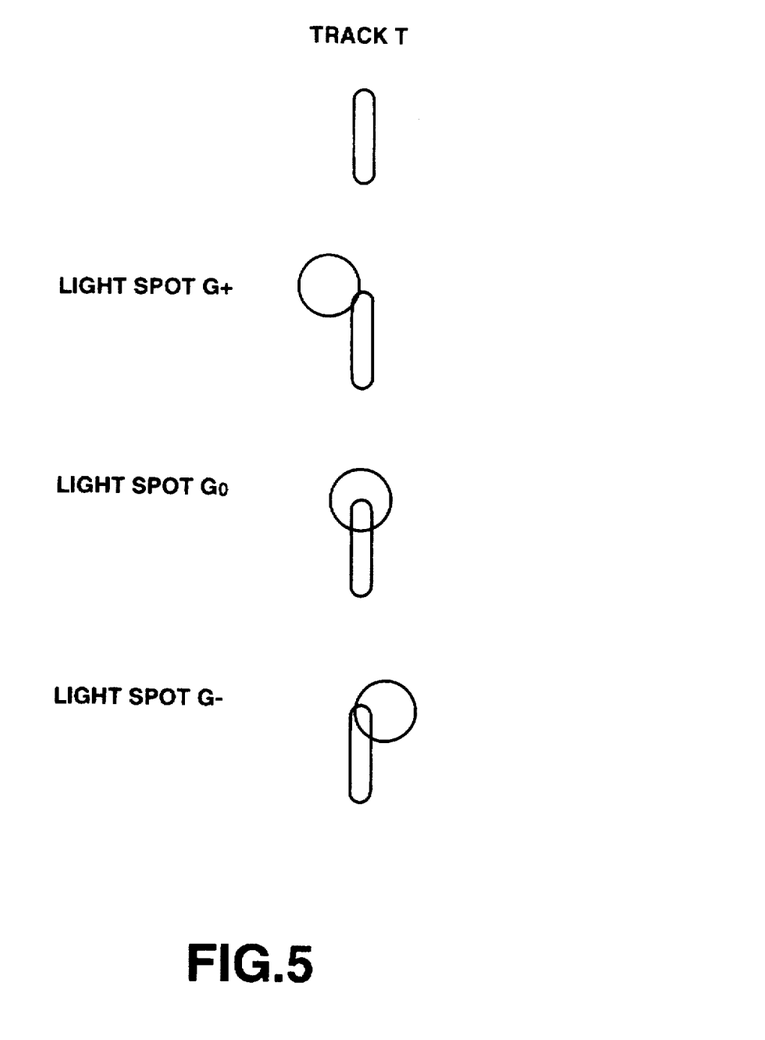
FIG. 5 is a plan view of a double-layer optical disc for illustrating the state of three light spots radiated on a track on one of the information signal layers of the double-layer optical disc.

The diffused laser light beam outgoing from a light source 21, such as a laser diode, is collimated by a collimating lens 22 and separated by a diffraction lattice 23 into 0-order light for the main beam and into ±1 order light for the two auxiliary beams. The laser light separated into these three beams is passed through a beam splitter 24 and converged by an objective lens 25 so as to be radiated on a track of a first information signal layer 26a of the double-layer optical disc 26 as shown in FIGS. 4 and 5. The main light spot formed by the 0-order light is termed $G_0$, while the auxiliary light spots formed by the +1 order light and the auxiliary light spots formed by the −1 order light are termed $G_+$ and $G_-$ respectively.

The reflected laser beam from the first information signal layer 26a is passed through the objective lens 25 and enters a light condensing lens 27 after separation and reflection by the beam splitter 24. The reflected laser beam condensed by the light condensing lens 27 is radiated via a cylindrical lens 28 onto a photodetector 29 provided with the first and second photodetectors 2 and 3.

Figure 6:
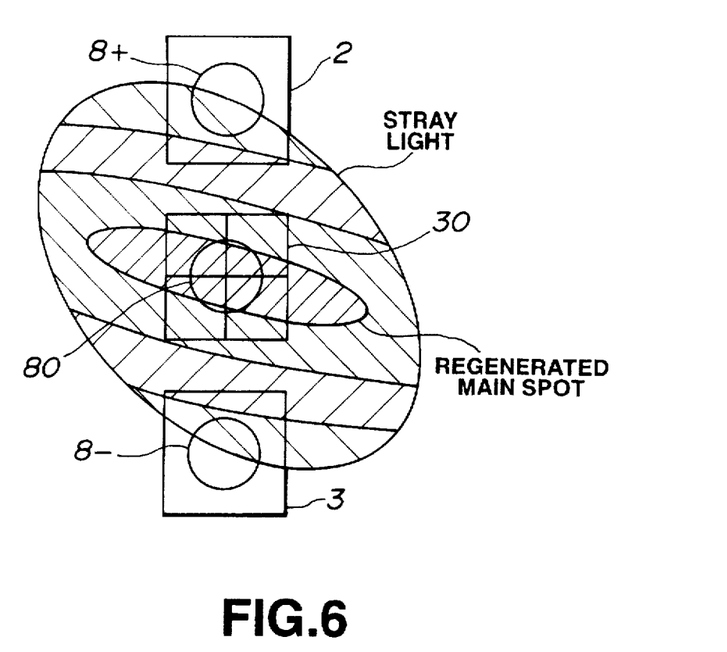
FIG. 6 is a plan view showing the state of a reflected light beam spot on a photodetector in the absence of transverse movement of the objective lens used in the optical pickup unit.

The photodetector 29 is configured as shown in FIG. 6 in which the first photodetector 2 and the second photodetector 3 are respectively arranged on opposite sides of a photodetector 30 for the reflected main beam. The first photodetector 2, the second photodetector 3 and the photodetector 30 receive the reflected light spot $g_+$ of the auxiliary light spot $G_+$, the reflected light spot g of the auxiliary light spot G and the reflected light spot $g_0$ of the main light spot $G_0$, respectively.

However, the reflected light of the signal-reproducing main beam from the layer of the double-layer optical disc 26 other than the layer being reproduced, that is, the stray light, leaks into the first and second photodetectors 2 and 3, respectively.

Figure 7:
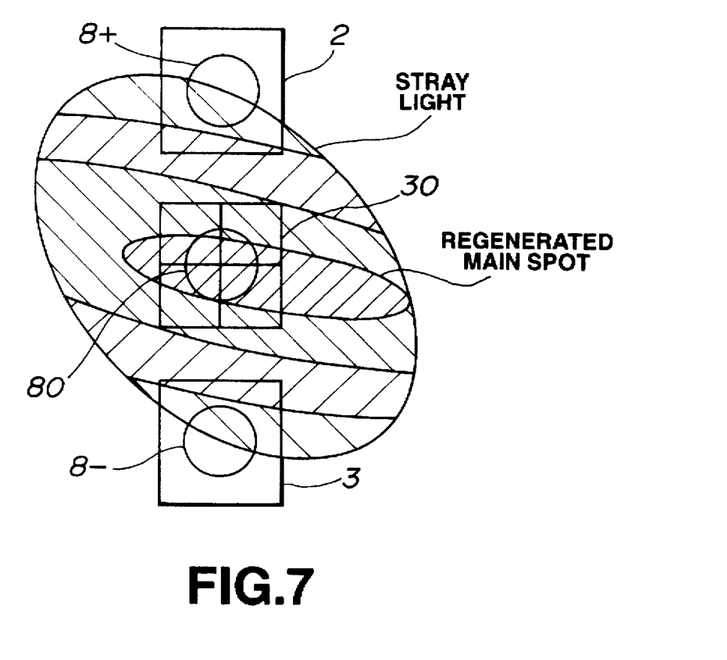
FIG. 7 is a plan view showing the state of a reflected light beam spot on a photodetector in the presence of transverse movement of the objective lens used in the optical pickup unit.

If the stray light leaking into the first photodetector 2 and that leaking into the second photodetector 3 are equal to each other as shown in FIG. 6, there is no problem raised in generating a tracking error signal. However, if the amount of the stray light leaking into the photoresistor 2 differs from that leaking into the photodetector 3 due to movement of stray light spots on the photodetector surface caused by transverse movement of the objective lens during tracking or mechanical deviations in the photodetector positions, as shown in FIG. 7, there is produced an offset in the tracking error signal, such that correct tracking cannot be achieved.

The tracking control apparatus 1 for the double-layer optical disc is configured as shown in FIG. 2, and operates in the manner now to be explained by referring to the signal waveforms shown in FIG. 8. Thus, it becomes possible to eliminate offset of the tracking error signal generated due to movement of the stray light spot on the photodetector 29 caused by the transverse movement of the objective lens 25 during tracking or mechanical deviations in the positions of the photodetector 29 for assuring correct tracking.

Figure 8A:
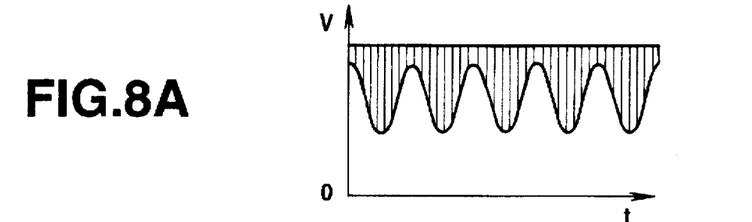
FIGS. 8A to 8E are signal waveform diagrams for illustrating the operation of a tracking control apparatus for the double-layer optical disc.
Figure 8B:
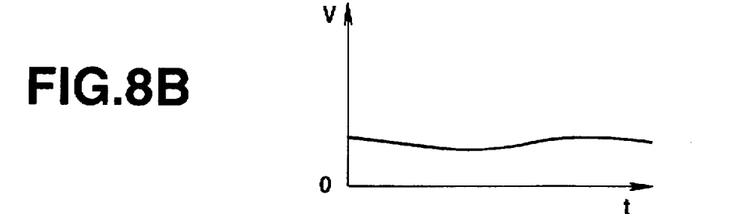
Figure 8C:
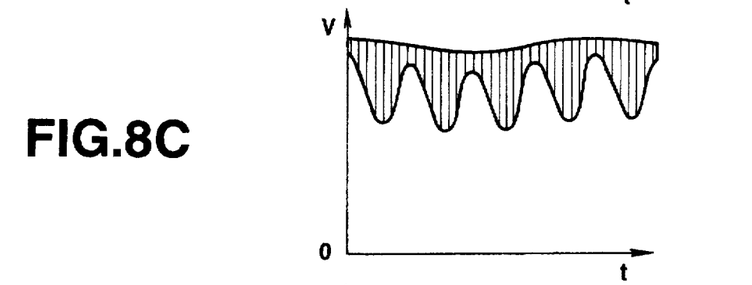
Figure 8D:
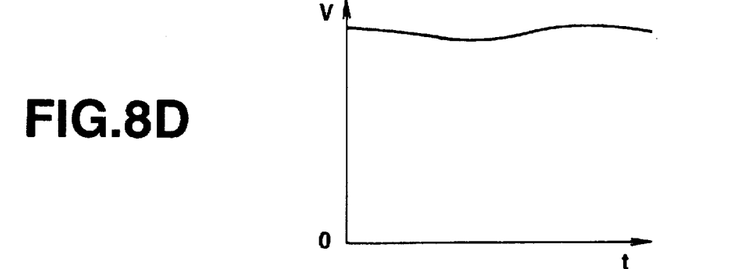
Figure 8E:
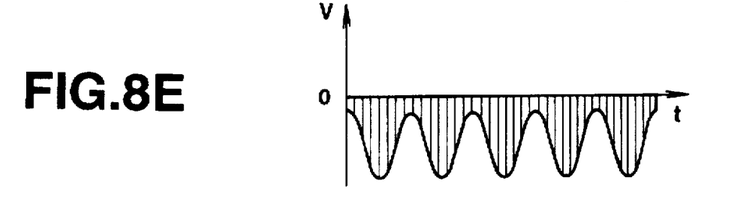

If the stray light is taken into account, the stray light leaking into the first and second photodetectors 2 and 3 operating as the photodetectors for the reflected beam for tracking control may be deemed as dc light not having signal components. If the as-detected signal light caused by the transverse movement of a low pre-set period of the objective lens, as one of the causes for offset, is considered for only the first photodetector 2, the amount of the stray light entering the photodetector 29 is varied by transverse movement of the objective lens, such that a signal shown in FIG. 8C, that is a signal in the absence of the stray light as shown in FIG. 8A, dc-summed to the signal by the stray light, as shown in FIG. 8B, is obtained. Thus, by taking out the upper envelope detection signal shown in FIG. 8D from the signal shown in FIG. 8C, using the upper envelope detector 6, fluctuating components by the stray light can be extracted, whereas, by subtracting the signal shown in FIG. SD from the signal shown in FIG. 8C using the first subtractor 8, the signal freed of the fluctuations caused by the stray light, as shown in FIG. 8E, may be obtained.

The same analysis holds for the output of the second photodetector 3. That is, a signal shown at FIG. 8D is obtained using the upper envelope detector 7, and a signal shown in FIG. 8E, freed of the fluctuations caused by the stray light by the second subtractor 9, is produced, and a difference signal is found by the third subtractor 10. The low-frequency signal of the difference output is used as a tracking error signal freed of the offset by the stray light, thus assuring a stable tracking operation.

The tracking control apparatus for the multi-layer optical disc according to the present invention is not limited to the above-described embodiments and may be effectively employed for reproducing an optical disc having two or more layers. If the preset system is used, there may be obtained stable tracking characteristics not affected by movement of the stray light on the photodetector surface caused by mechanical deviation of the photodetector position.

We claim:

1. A tracking control apparatus for a multi-layer optical disc for controlling tracking of a main beam with respect to a track of a signal recording layer of the multi-layer optical disc responsive to a difference of reflected beams from a information signal layer of two auxiliary beams radiated along with the main beam on the information signal layer of the multi-layer optical disc produced by layering a plurality of information signal layers, comprising:

first photodetector means for detecting one of the reflected beams of the two auxiliary beams from the information signal layer;

second photodetector means for detecting the other of the reflected beams of the auxiliary beams from the information signal layer;

first upper envelope detection means for detecting an upper envelope detection signal of the detection signal of said one of the auxiliary reflected beam as detected by said first photodetector means;

second upper envelope detection means for detecting an upper envelope signal of the detection signal of the other auxiliary reflected beam as detected by said second photodetector means;

first subtraction means for subtracting a detection output by said first upper envelope detection means from a detection signal of said first photodetector means;

second subtraction means for subtracting a detection output by said second upper envelope detection means from a detection signal of said second photodetector means;

third subtraction means for subtraction between an output of said first subtraction means and an output of said second subtraction means.

2. The tracking control apparatus for a multi-layer optical disc as claimed in claim 1 wherein said multi-layer optical disc is a double-layer optical disc having first and second information signal layers.

3. The tracking control apparatus for a multi-layer optical disc as claimed in claim 1, wherein said first photodetector means provides a first detection signal representative of the one of the reflected beams of the two auxiliary beams, and further comprising a first current-to-voltage converting amplifier means for converting said first detection signal into a voltage signal which is amplified and provided to the first upper envelope detection means.

4. The tracking control apparatus for a multi-layer optical disc as claimed in claim 3, wherein said second photodetector means provides a second detection signal representative of the other of the reflected beams of the two auxiliary beams, and further comprising a second current-to-voltage converting amplifier means for converting said second detection signal into a voltage signal which is amplified and provided to the second upper envelope detection means.

5. The tracking control apparatus for a multi-layer optical disc as claimed in claim 1, wherein said third subtraction means provides a substraction output, and further including a low-pass filter means for bandwidth-limiting said substraction output before being output as a tracking error signal.

6. The tracking control apparatus for a multi-layer optical disc as claimed in claim 1, wherein the first upper envelope detector means includes transistors $Q_1$ and $Q_2$ and a first differential amplifier wherein the transistor $Q_1$, has its collector grounded, its emitter connected to a resistor $R_3$, and its base provided with an output signal of a current-to-voltage converting amplifier, the transistor $Q_2$ has its base connected to an emitter of the transistor $Q_1$, and its emitter connected to a parallel connection of a resistor $R_4$ and a capacitor $C_1$, the first differential amplifier has its positive input terminal connected to an emitter of the transistor $Q_1$ and has its output fed back to its negative input terminal.

7. The tracking control apparatus for a multi-layer optical disc as set forth in claim 6 wherein the second upper envelope detector means includes a transistor $Q_3$, a transistor $Q_4$ and a second differential amplifier, wherein the transistor $Q_3$ has its collector grounded, its emitter connected to a resistor $R_5$, and its base provided with an output signal of a current-to-voltage converting amplifier, the transistor $Q_4$ has its base connected to an emitter of the transistor $Q_3$ and its emitter connected to a parallel connection of a resistor $R_6$ and a capacitor $C_2$, the differential amplifier has its positive input terminal connected to an emitter of the transistor $Q_4$ and has its output fed back to its negative input terminal.

8. The tracking control apparatus for a multi-layer optical disc as set forth in claim 1, further including an optical pickup unit comprising a light source for providing a diffused laser light beam, means for separating said light beam into 0-order light for a main beam and into +1 order light for the two auxiliary beams, said main beam and said two auxiliary light beams being converged and radiated on a track of a first information layer of the optical disc.

* * * * *